United States Patent
Dalimba et al.

(10) Patent No.: US 10,546,613 B2
(45) Date of Patent: Jan. 28, 2020

(54) REAL-TIME POSITIONING OF CURRENT-PLAYING-POSITION MARKER ON PROGRESS BAR AND INDEX FILE GENERATION FOR REAL-TIME CONTENT

(71) Applicant: Sling Media Pvt. Ltd., Bangalore (IN)

(72) Inventors: Laxminarayana Dalimba, Bangalore (IN); Vikal Kumar Jain, Bangalore (IN); Mohammed Rasool, Bangalore (IN); Varunkumar B. Tripathi, Bangalore (IN)

(73) Assignee: SLING MEDIA PVT LTD, Bangalore (IN)

( * ) Notice: Subject to any disclaimer, the term of this patent is extended or adjusted under 35 U.S.C. 154(b) by 0 days.

(21) Appl. No.: 15/869,767

(22) Filed: Jan. 12, 2018

(65) Prior Publication Data

US 2018/0137893 A1   May 17, 2018

Related U.S. Application Data

(63) Continuation of application No. 14/739,937, filed on Jun. 15, 2015, now Pat. No. 9,905,271.

(51) Int. Cl.
| | |
|---|---|
| *G11B 27/30* | (2006.01) |
| *H04N 21/8547* | (2011.01) |
| *H04N 21/472* | (2011.01) |
| *G11B 27/34* | (2006.01) |
| *H04N 21/41* | (2011.01) |
| *H04N 21/845* | (2011.01) |
| *H04N 21/854* | (2011.01) |

(52) U.S. Cl.
CPC ......... *G11B 27/3081* (2013.01); *G11B 27/34* (2013.01); *H04N 21/4126* (2013.01); *H04N 21/47217* (2013.01); *H04N 21/8455* (2013.01); *H04N 21/8547* (2013.01); *H04N 21/85406* (2013.01)

(58) Field of Classification Search
CPC combination set(s) only.
See application file for complete search history.

(56) References Cited

U.S. PATENT DOCUMENTS

| | | |
|---|---|---|
| 2004/0019911 A1 | 1/2004 | Gates et al. |
| 2006/0150071 A1 | 7/2006 | Chen |

(Continued)

*Primary Examiner* — Thai Q Tran
*Assistant Examiner* — Sunghyoun Park
(74) *Attorney, Agent, or Firm* — Seed IP Law Group LLP

(57) ABSTRACT

Embodiments are directed towards presenting a current-playing-position marker on a progress bar along with real time content. An initial timeline value of the content may be determined, along with an initial presentation timestamp value for the first frame of the content. For each next frame of the content, a next timeline value may be determined based on a difference between a next presentation timestamp value for a corresponding next frame and the initial presentation timestamp value, and mapping of the next presentation timestamp value for the corresponding next frame and the next timeline value in the index file. The content and a progress bar may be displayed to the user on a remote device based on the index file. A position of the current-playing-position marker on the progress bar for each frame of the content may be determined based on the next timeline value for each corresponding frame.

20 Claims, 8 Drawing Sheets

(56) References Cited

U.S. PATENT DOCUMENTS

| | | | |
|---|---|---|---|
| 2008/0031595 A1* | 2/2008 | Cho | G11B 27/34 |
| | | | 386/278 |
| 2008/0190266 A1* | 8/2008 | Kim | G06F 3/0488 |
| | | | 84/602 |
| 2010/0228418 A1* | 9/2010 | Whitlow | G11B 27/105 |
| | | | 701/25 |
| 2011/0055881 A1 | 3/2011 | Yu et al. | |
| 2011/0249861 A1* | 10/2011 | Tokutake | G11B 27/34 |
| | | | 382/103 |
| 2012/0005365 A1* | 1/2012 | Ma | G06Q 30/0241 |
| | | | 709/231 |
| 2013/0188923 A1* | 7/2013 | Hartley | H04N 9/87 |
| | | | 386/241 |
| 2013/0195424 A1* | 8/2013 | Ohashi | H04N 21/4332 |
| | | | 386/241 |
| 2014/0082666 A1 | 3/2014 | Bloch et al. | |
| 2014/0140417 A1 | 5/2014 | Shaffer et al. | |
| 2015/0026575 A1* | 1/2015 | Martin | G06F 3/04842 |
| | | | 715/720 |

* cited by examiner

REAL-TIME POSITIONING OF CURRENT-PLAYING-POSITION MARKER ON PROGRESS BAR AND INDEX FILE GENERATION FOR REAL-TIME CONTENT

BACKGROUND

Technical Field

The present disclosure relates generally to displaying real-time audiovisual content to a user, and more particularly, but not exclusively, to determining a position of a current-playing-position marker on a progress bar and real-time index file generation while the real-time content is being provided to a user.

Description of the Related Art

Today, users often consume audiovisual content on mobile devices. More recently, users have been able to transmit content from a home or host device, such as a set-top box, to their mobile devices. In this way, a user can have a subscription to view various television channels and content at their home—and utilize features of the set-top box, such as digital video recording—and have the ability to access that content remotely.

Content is typically displayed to the user along with a progress bar, which generally displays information about the rate at which the content is presented. A progress bar often includes a current-playing-position marker that moves along the progress bar so that the location of the currently displayed video frame can be seen relative to the entire video. This progress bar can also enable a user to seek to a desired position in the video, which is generally accomplished with the use of an index file that is generated prior to distribution of the content. However, when content is generated and provided to a user in real time, this index file may not be generated or may not be provided along with the content, which can result in an inaccurate position of the current-playing-position marker on the progress bar.

BRIEF SUMMARY

Briefly stated, embodiments are directed towards presenting a current-playing-position marker on a progress bar to a user along with real time content. Content may be provided in real time to a host device, such as a set-top box, of a user. The host device may generate an index file in real time for the content. To generate the index file, an initial timeline value of the content for the progress bar may be determined, and an initial presentation timestamp (PTS) value may be determined for the first frame of the content. For each next frame of the content, a next timeline value may be determined based on a difference between a next presentation timestamp value for a corresponding next frame and the initial presentation timestamp value, and mapping of the next presentation timestamp value for the corresponding next frame and the next timeline value may be stored in the index file. The host device may provide the content and the index file to a remote device for display in real time. The content and a progress bar may be displayed to the user on the remote device based on the index file. A position of the current-playing-position marker on the progress bar for each frame of the content may be determined based on the next timeline value for each corresponding frame.

In some embodiments, the position of the current-playing-position marker on the progress bar may be determined for a given frame of the content by determining a distance on the progress bar based on a length of the progress bar, a total duration of the content, and a difference between the next timeline value for the given frame and the initial timeline value. In other embodiments, the position of the current-playing-position marker on the progress bar may be determined for a given frame of the content by determining a distance on the progress bar based on a length of the progress bar, a total duration of the content, and the difference between a presentation timestamp value for the given frame and the initial presentation timestamp value.

In various embodiments, a user-adjusted position of the current-playing-position marker on the progress bar may be received. The user-adjusted position may include a timeline value associated with the position of the moved current-playing-position marker. The index file may be employed to determine a frame that is associated with the user-adjusted position based on the timeline value. Playback of the content may begin from the determined frame and displayed to the user.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in associated with the accompanying drawings, the drawings include.

DETAILED DESCRIPTION

Figure 1:
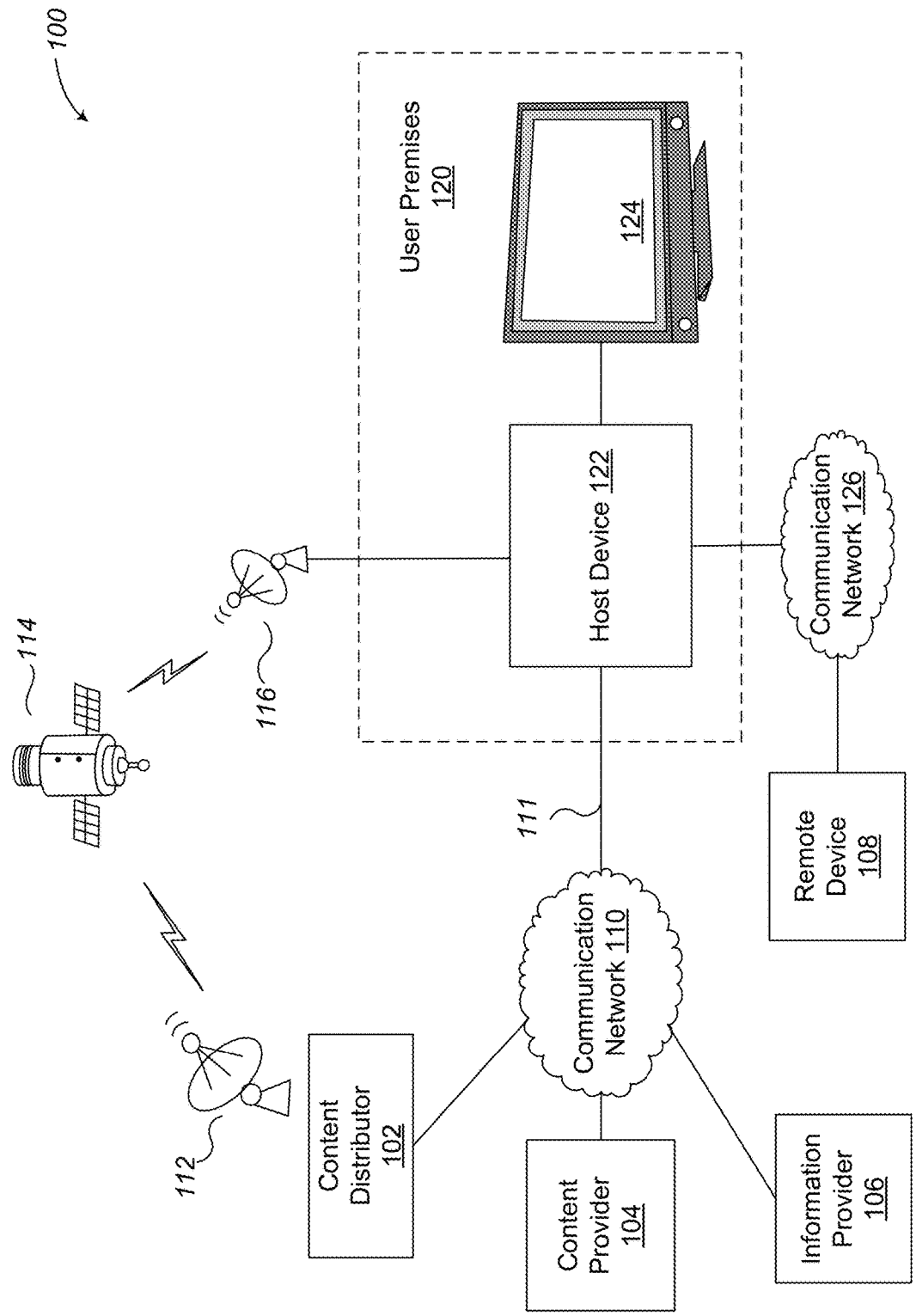
FIG. 1 illustrates a context diagram for providing audiovisual content to a user in accordance with embodiments described herein.

FIG. 1 shows a context diagram of one embodiment for providing audiovisual content to a user in accordance with embodiments described herein. Example 100 may include content provider 104, information provider 106, content distributor 102, remote device 108, communication networks 110 and 126, and user premises 120.

Typically, content providers 104 generate, aggregate, and/or otherwise provide audiovisual content that is provided to one or more users. Sometimes, content providers are referred to as "channels." Examples, of content provider 104 may include, but are not limited to, film studios, television studios, network broadcasting companies, independent content producers, such as AMC, HBO, Showtime, or the like, or other entities that provide content for user consumption. A content provider may also include individuals that capture personal or home videos, and who want to distribute these videos to others over various online media-sharing websites or other distribution mechanisms.

Information provider 106 may create and distribute data or other information that describes or supports audiovisual content. Generally, this data is related to the content provided by content provider 104. For example, this data may include, for example, metadata, program name, closed-caption authoring and placement within the content, timeslot data, pay-per-view and related data, or other information that is associated with the content. In some embodiments, a program distributor 102 may combine or otherwise associate the data from information provider 106 and the content from content provider 104, which may be referred to as the distributed content. However, other entities may also combine or otherwise associate the content and other data together.

Content distributor 102 may provide the content, whether obtained from content provider 104 and/or data from information provider 106, to a user through a variety of different distribution mechanisms. For example, in some embodiments, content distributor 102 may provide the content and data to a user's host device 122 directly through communication network 110 on link 111. In other embodiments, the content and data may be sent through uplink 112, which goes to satellite 114 and back to downlink station 116 that may also include a head end (not shown). The content and data are then sent to an individual host device 122 of a user/customer at user premises 120.

Communication network 110 may be configured to couple various computing devices to transmit content/data from one or more devices to one or more other devices. For example, communication network 110 may be the Internet, X.25 networks, or a series of smaller or private connected networks that carry the content and other data. Communication network 110 may include one or more wired or wireless networks.

Host device 122 may be a receiving device of the content from content distributor 102. Examples of host device 122 may include, but are not limited to, a set-top box, a cable connection box, a computer, or the like. Host device 122 may be configured to provide the content to a user's display device 124, such as a television, monitor, or other display device. In some embodiments, users may have one or more host devices 122 that may be attached to one or more display devices 122 within a business or end-user's premises 120.

In various embodiments, host device 122 is also configured to provide content to a remote device 108 of the user, which may be through communication network 126. Host device 122 typically receives content from the content provider, stores at least a temporary copy of the content, and can retransmit, stream, or otherwise transfer the content to remote device 108. The user of host device 122 may use a media player application on remote device 108 to connect to host device 122 in order to receive and view the content on the remote device 108. Once connected, host device 122 encodes the stored content and transmits the encoded content to remote device 108 via communication network 126. The content is encoded according to a number of parameters such as resolution, streaming bit rate, frame rate, and so on. As remote device 108 receives the encoded content, it utilizes the media player application to decode, render, or play the content received from host device 122. Further, host device 122 may alter the encoding parameters during transmission at the direction of the media player application, which may occur as a result of various changes in characteristics of the content, the communication network, or the like.

Remote device 108 may be a mobile phone or smartphone, a tablet computer, a laptop computer, desktop computer, or other computing device of the user. Remote device 108 allows the user to view the content received at host device 122 on a device other than on display device 124. In this way, the user can watch live or previously recorded programs from their remote device 108 when they are not at home and do not have direct access to their host device 122.

It should be appreciated that remote device 108 is not just rendering a display of content for host device 122, as display device 124 is, but rather host device 122 is transmitting, streaming, or otherwise transferring the content to remote device 108, which buffers and displays the content to the user on remote device 108. Actions taken by the user on the content on remote device 108, such as stop, play, pause, seek, or the like are provided from remote device 108 to host device 122 to alter the transmission of the content to remote device 108 or are performed by the remote device itself on the buffered copy. In contrast, display device 124 renders the content to the user and host device 122 performs actions directly on the content without any participation by display device 124.

Communication network 126 may be configured to couple various computing devices to transmit content/data from one or more devices to one or more other devices, such as host device 122 streaming content to remote device 108. In some embodiments, communication network 126 may be included in communication network 110. And in other embodiments, communication network 126 may be separate and/or distinct from communication network 110, and the networks may or may not have any direct communications between them.

In various embodiments, host device 122 may provide content to remote device 108 in real time. It should be noted that providing content in real time refers to content that is provided from the host device to the remote device for concurrent display to the user as the host device receives the content. It will be appreciated that there may be some delay in displaying the content to the user due to processing and transmitting the content to the remote device.

In some embodiments, real-time content is content provided to host device 122 and transmitted to remote device 108 as it is being generated but before all of the content is generated. Examples of such real-time content may include, but are not limited to, live sporting events, live new broadcasts, live awards shows, or other live performances. However, embodiments are not so limited and real-time content can include other content that is provided to the host device without a corresponding index file.

Figure 2:
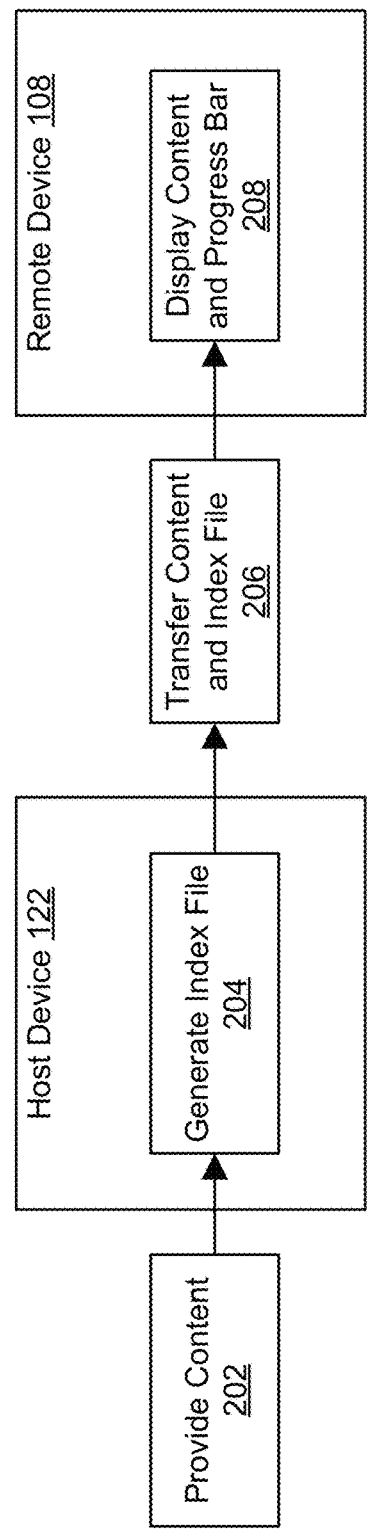
FIG. 2 is a diagram of one non-limiting embodiment of a system for generating an index file for content provided to a user in real time in accordance with embodiments described herein.

FIG. 2 is a diagram of one non-limiting embodiment of a system for generating an index file for content provided to a user in real time in accordance with embodiments described herein. System 200 includes host device 122 and remote device 108. Content 202 may be provided to host device 122 from a content provider, such as described above in conjunction with FIG. 1. In various embodiments, host device 122 may store, at least temporarily, a copy of content 202.

The content may be provided in a transport stream to host device 122. The transport stream may encapsulate the content into packetized elementary streams that are made up of a plurality of packets. Each packet may be associated with a frame of the content. Along with the frame data, a packet often includes a presentation timestamp (PTS) value. Presentation timestamp values are used by media players to identify when to present/display a corresponding frame. So, presentation timestamp values identify the sequence or ordering of the frames of the content.

The presentation timestamp is a timestamp metadata field in a Moving Picture Experts Group (MPEG) transport stream or program stream that is used to achieve synchronization of separate elementary streams of content, such as video, audio, or subtitles, when presented to the viewer. The presentation timestamp is typically given in units related to a program's overall clock reference, such as the program clock reference or system clock reference. The program's overall clock reference is also transmitted along with the content in the transport stream or program stream. In some embodiments, decoding of the elementary streams is synchronized by adjusting the decoding of the streams to a common master time base rather than by adjusting the decoding of one stream to match that of another. The master time base may be one of the decoders' clock, the data source's clock, or it may be some external clock. Accordingly, the presentation timestamp of a content frame enables synchronization and ordering of content frames. Other presentation timestamps of other imaging formats or compression and transmission standards may also be employed.

As the content is being provided to host device 122, the host device generates an index file 204 for the content. The index file includes a mapping of timeline values to content frames. Generation of the index file is described in greater detail below. Briefly, however, timeline values are determined based on a difference in the presentation timestamp value of a current frame and the presentation timestamp value of an initial frame. In this way, an exact position of a current-playing-position marker on a progress bar can be determined, and a user can utilize the progress bar, which is also referred to as a seek bar or slider bar, to employ seek functions to replay and/or advance the display of the content from a given point in time in the content.

Host device 122 then transfers the content and index file 206 to remote device 108. In some embodiments, the host device may generate/update the index file for each frame and provide it along with each frame to the remote device. In other embodiments, the host device may generate, maintain, and provide the index file to the remote device periodically, such as every x number of frames or every y seconds.

Remote device 108 displays the content and progress bar 208 to a user on a screen or other display device. The progress bar includes a current-playing-position marker that advances along the progress bar at the rate at which the content is being displayed relative to the total duration of the content to indicate the current play progress of the content. So, in some embodiments, as content is being displayed, the current-playing-position marker will move on the progress bar from left to right on the screen. As described herein, the position of the current-playing-position marker on the progress bar is determined based on timeline values in the index file, where the timeline values are determined in real time as the content is being provided based on a difference between a current frame presentation timestamp value and an initial frame presentation timestamp value relative to an initial timeline value.

Figure 3:
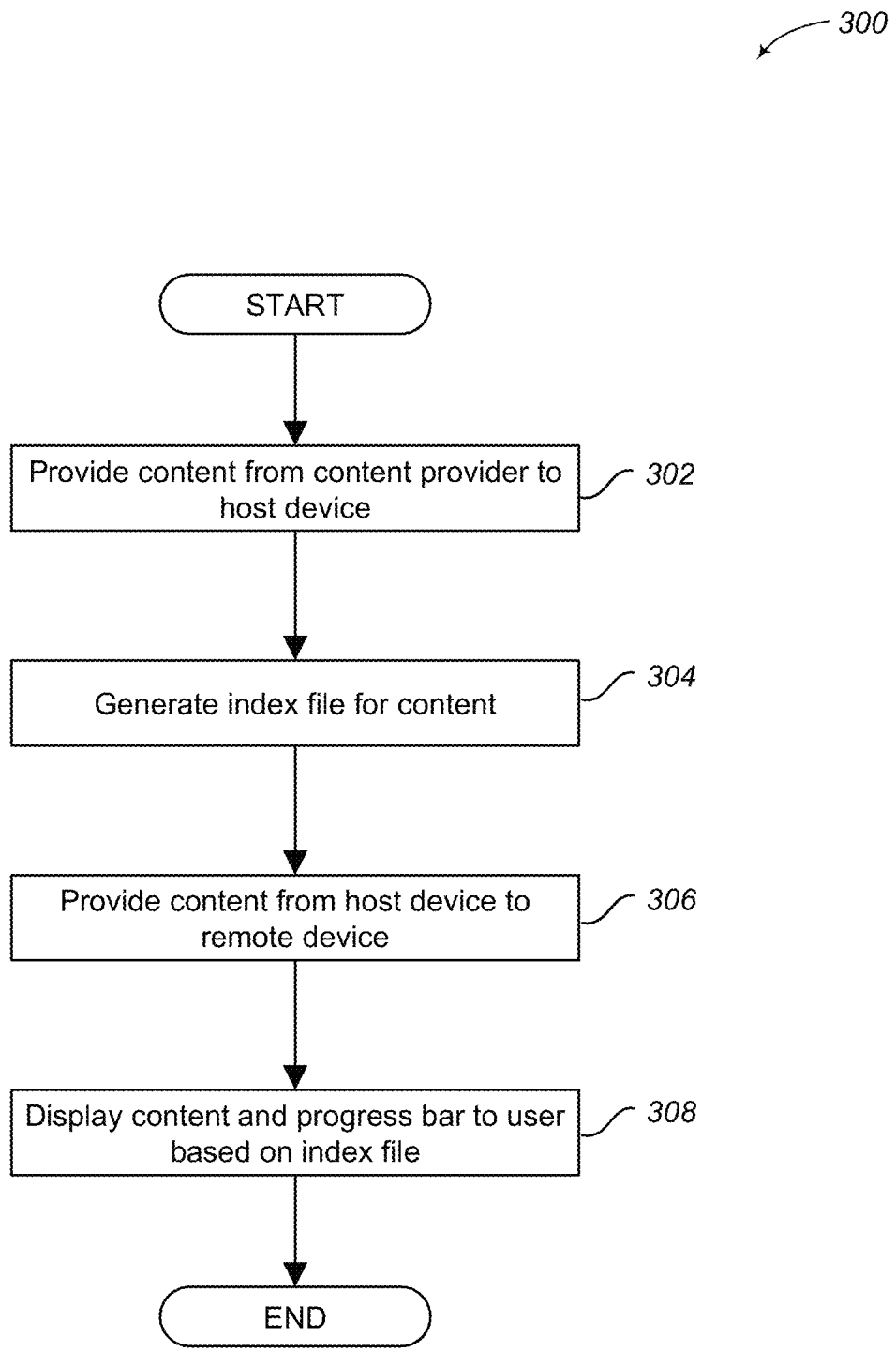
FIG. 3 illustrates a logical flow diagram generally showing one embodiment of an overview process for providing content to a user in accordance with embodiments described herein.

FIG. 3 illustrates a logical flow diagram generally showing one embodiment of an overview process for providing content to a user in accordance with embodiments described herein. In various embodiments, at least portions of process 300 may be performed by host device 122 and remote device 108.

Process 300 begins, after a start block, at block 302, where content is provided from a content provider to a host device. In various embodiments, the host device may be an embodiment of host device 122. The content may be streamed to the host device in real time.

Process 300 proceeds to block 304, which is described in more detail below in conjunction with FIG. 4. Briefly, however, an index file is generated that maps or otherwise relates timeline values for a progress bar to presentation timestamps values for each corresponding frame of the content. These timeline values are utilized to determine a position of the current-playing-position marker on the progress bar for each frame. As described herein, each timeline value is determined based on a difference between the presentation timestamp value of a corresponding frame and the presentation timestamp value of an initial frame.

Process 300 continues at block 306, where the content is provided from the host device to a remote device of the user. In various embodiments, the remote device may be an embodiment of remote device 108. In at least one embodiment, the remote device may be a mobile device. In this way, the user has remote access to their host device via their remote device, and the host device can perform its typical operations on the content, such as recording programs as a DVR, seek functionality, or the like.

In various embodiments, the host device also sends the generated index file to the remote device. The index file may be provided to the remote device with each frame, or periodically at predetermined time or frame intervals.

Process 300 proceeds next to block 308, where the content and a progress bar are displayed to the user. In various embodiments, a position of a current-playing-position marker on the progress bar is determined based on the index file, which is described in more detail below in conjunction with FIG. 5.

After block 308, process 300 may terminate and/or otherwise return to a calling process.

Figure 4:
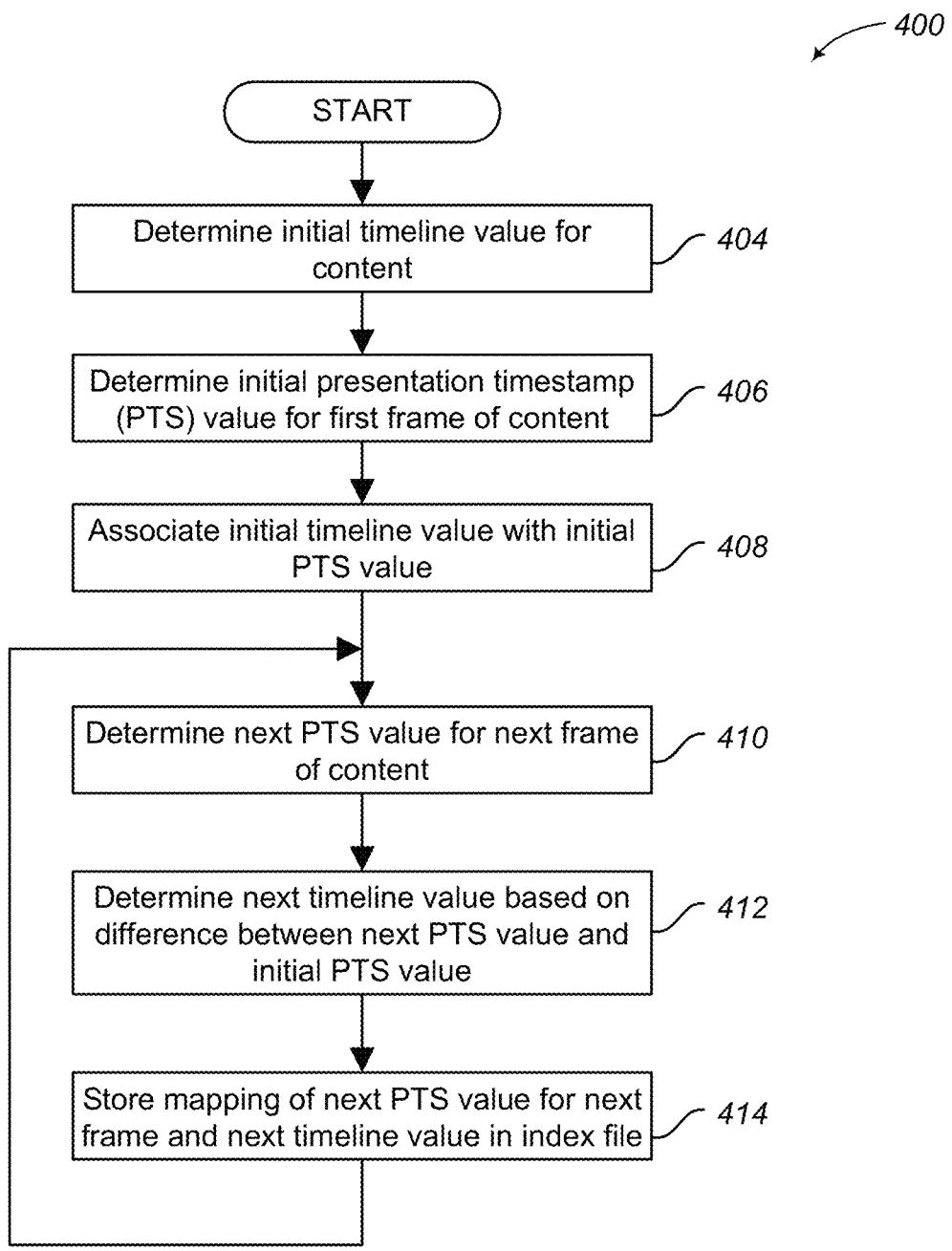
FIG. 4 illustrates a logical flow diagram generally showing one embodiment of a process for generating an index file for content provided to a user in real time in accordance with embodiments described herein.

FIG. 4 illustrates a logical flow diagram generally showing one embodiment of a process for generating an index file for content provided to a user in real time in accordance with embodiments described herein. In various embodiments, at least portions of process 400 may be performed by host device 122. However, embodiments are not so limited and other devices may also perform various aspects of process 400, such as, but not limited to, content distributor 102, remote device 108, or the like.

Process 400 begins, after a start block, at block 402, where an initial timeline value is determined for the content. The initial timeline value may be a default timeline value or an application provided timeline value. For example, in some embodiments, the initial timeline value may be zero because that it is the start of the content that the user is viewing or the start of content being provided to the host device or remote device. In other embodiments, the initial timeline value may a current time of the host device or the remote device. In yet other embodiments, the initial timeline value may be a start time of the content, such as a broadcast time of a program, regardless of the time the content begins streaming to the host device or to the remote device to be viewed by the user.

Process 400 proceeds to block 406, where an initial presentation timestamp value is determined for the first frame of the content. In various embodiments, metadata associated with the initial frame may include the presentation timestamp value for the initial frame. It should be noted that the initial frame is the first frame of the content that is provided to the host device.

Process 400 continues at block 408, where the initial timeline value and the initial presentation timestamp value are associated with one another. The initial timeline value may be utilized to normalize the presentation timestamp values of the content to the timeline of the progress bar.

Process 400 proceeds next to block 410, where a next presentation timestamp value is determined for a next frame of the content. In various embodiments, metadata associated with the next frame may include the next presentation timestamp value for that corresponding next frame.

Process 400 continues next at block 412, where a next timeline value is determined for the next frame. The next timeline value is determined based on a difference between the next presentation timestamp value and the initial presentation timestamp value. In some embodiment, the initial presentation timestamp value may be subtracted from the next presentation timestamp value. In other embodiments, the next timeline value may be normalized relative to the initial timeline value such that the next timeline value is the combination of the initial timeline value and the difference between the next presentation timestamp value and the initial presentation timestamp value. In this way, the next timeline value of the next frame is relative to a timeline that starts with a non-zero value on the progress bar.

Process 400 proceeds next to block 414, where the index file is generated or updated for the next frame to include at least a mapping of the next presentation timestamp value and the next timeline value. This mapping includes defining a relationship between the next frame, the next presentation timestamp for the next frame, and the next timeline value. In some embodiments, each separate entry in the index file may be for each separate frame. An entry may include the presentation timestamp value and the timeline value that correspond to the frame for that entry. It should be noted that the index file may also include other data.

After block 414, process 400 loops to block 410 to determine a next timeline value for a next frame and update the index file accordingly. Although process 400 is described with reference to a next frame, a next presentation timestamp, and a next timeline value, as process 400 loops, the next frame is the current frame received by the host device, the next presentation timestamp value is the presentation timestamp of the current frame, and the next timeline value is the timeline value of the current frame. Process 400 may continue to loop until a last frame of the content is processed.

Figure 5:
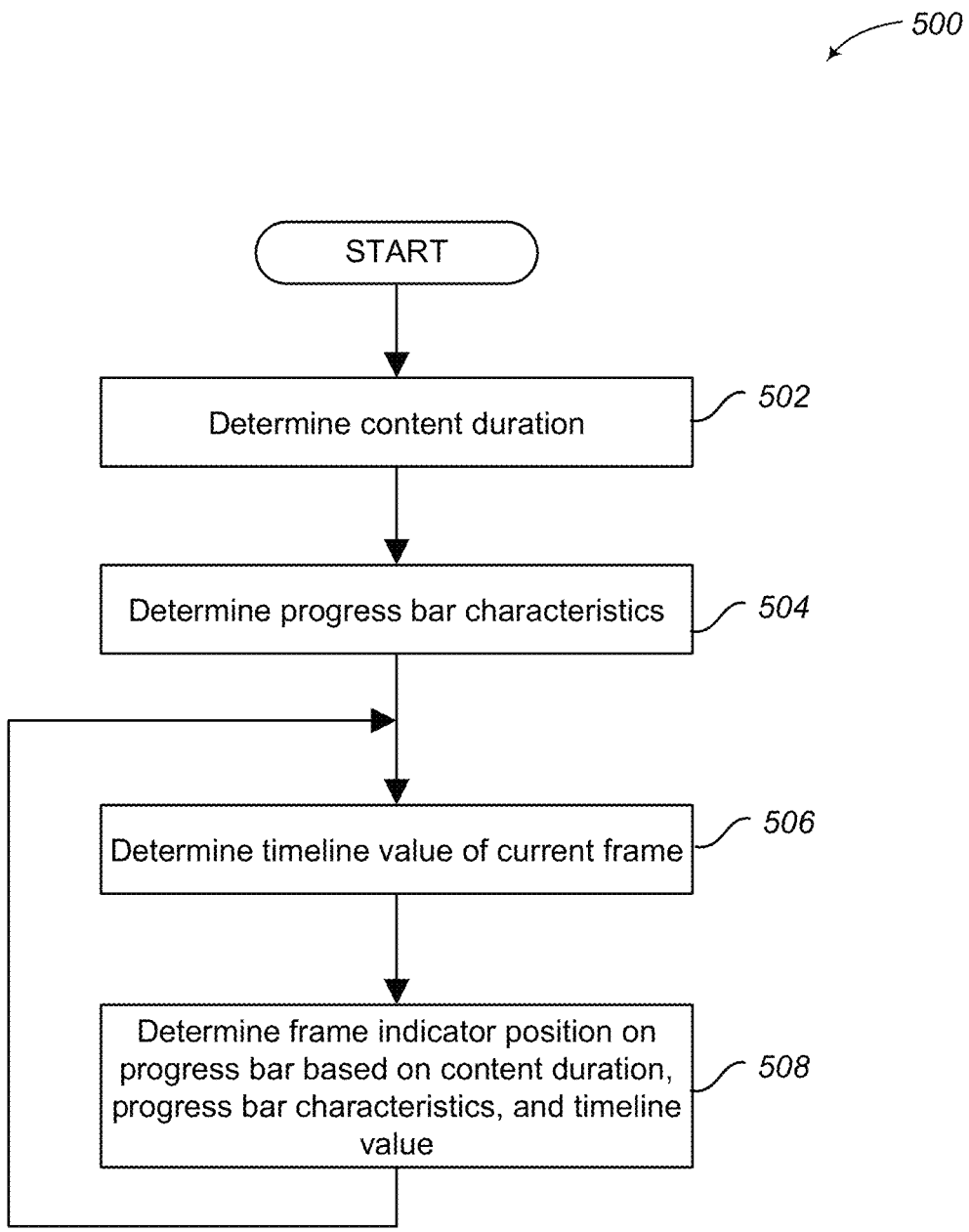
FIG. 5 illustrates a logical flow diagram generally showing one embodiment of a process for determining a position of a current-playing-position marker on a progress bar for the real-time content in accordance with embodiments described herein.

FIG. 5 illustrates a logical flow diagram generally showing one embodiment of a process for determining a position of a current-playing-position marker on a progress bar for the real-time content in accordance with embodiments described herein. In various embodiments, at least portions of process 500 may be performed by the remote device of the user, such as remote device 108. In some embodiments, an application layer on the remote device executes in conjunction with a media player on the remote device to position the current-playing-position marker on the progress bar and display the progress bar along with the content.

Process 500 begins, after a start block, at block 502, where a total duration of the content is determined. In various embodiments, the total duration of the content may be provided along with the content, such as in an initial packet or set of packets of the content transport stream. In some embodiments, the total duration may be an anticipated lapse time or program window time. For example, a live broadcast of a hockey game may have a program window of three hours. In this example, three hours would be the total duration of the content, even though the content may end before or after the end of the three hour window. Along with the total duration, an initial timeline value of the progress bar may also be provided along with the content.

Process 500 continues at block 504, where one or more progress bar characteristics are determined. These characteristics may include a length of the progress bar, which may be based on a screen size of the remote device, orientation of the remote device, or the like; a granularity of the progress bar, such as a number of discrete positions for the current-playing-position marker on the progress bar; or the like. In some embodiments, the granularity of the progress bar may change based on the content duration and the length of the progress bar. For example, a relatively short duration, such as two seconds, may result in a progress bar with a separate position for each frame of the content. In contrast, a relatively long duration, such as two hours, may result in a progress bar with a separate position for a plurality of frames of the content, so that position of the progress bar may not change for multiple frames.

Process 500 proceeds next to block 506, where a timeline value of a current frame is determined. The current frame may be the frame currently being displayed on the remote device. In some embodiments, the timeline value may be determined based on the index file. In at least one such embodiment, the application layer may request the presentation timestamp value of the currently displayed frame from the media player. The application layer can then utilize this presentation timestamp value to look up the corresponding timeline value in the index file.

In other embodiments, the content may be modified to include the timeline values of each frame. This modification may occur as the index file is being generated in FIG. 4. In at least one embodiment, the current frame may include its corresponding timeline value.

Process 500 continues next at block 508, where the position of the current-playing-position marker on the progress bar is determined for the current frame. This position may be determined based on a combination of at least the content duration, the length of the progress bar, and the timeline value for the current frame. In at one embodiment, the application layer may be employed to determine the position of the current-playing-position marker on the progress bar.

In some embodiments, where the initial timeline value is zero, then the position of the current-playing-position marker may be illustrated by the following equation:

$$x = \frac{a*b}{c} \quad (1)$$

where,
x is the distance of the current-playing-position marker from a start position on the progress bar, such as a distance from a leftmost position of the progress bar;
a is the timeline value;

b is the length of the progress bar; and c is the content duration.

In other embodiments, where the timeline values are normalized based on a non-zero initial timeline value, then the position of the current-playing-position marker may be illustrated by the following equation:

$$x = \frac{(a-d)*b}{c} \quad (2)$$

where, x is the distance of the current-playing-position marker from a start position on the progress bar, such as a distance from a leftmost position of the progress bar;

a is the timeline value;

b is the length of the progress bar;

c is the content duration; and d is the initial timeline value.

Once the distance x is determined, then this distance can be utilized to position the current-playing-position marker on the progress bar. The application layer along with the media player then displays the current frame of the content and the progress bar on the remote device.

After block 508, process 500 loops to block 506 to determine a timeline value of a next frame being displayed to the user. In some embodiments, process 500 may loop until a last frame of the content is displayed to the user.

It should be noted that due to the frequency at which frames are displayed, changes in the position of the current-playing-position marker may not be noticeable to a user from one frame to another depending on the content duration and length of the progress bar. So, in various embodiments, the position of the current-playing-position marker may not be determined for each frame but may rather be determined at a predetermined periodic frequency, such as, for example, every five frames. In one embodiment, the rate at which the position of the current-playing-position marker is determined may be based on the granularity of the progress bar.

Also, it should be recognized that the characteristics of the progress bar may change as a user is viewing the content. For example, the user may change the orientation of the remote device from a landscape view to a portrait view. Various embodiments of block 504 may be performed periodically, at predetermined time intervals, when a characteristic of the progress bar changes, or other triggering events throughout the viewing of the content to adjust the determination of the position of the current-playing-position marker based on changes in the progress bar characteristics.

Figure 6:
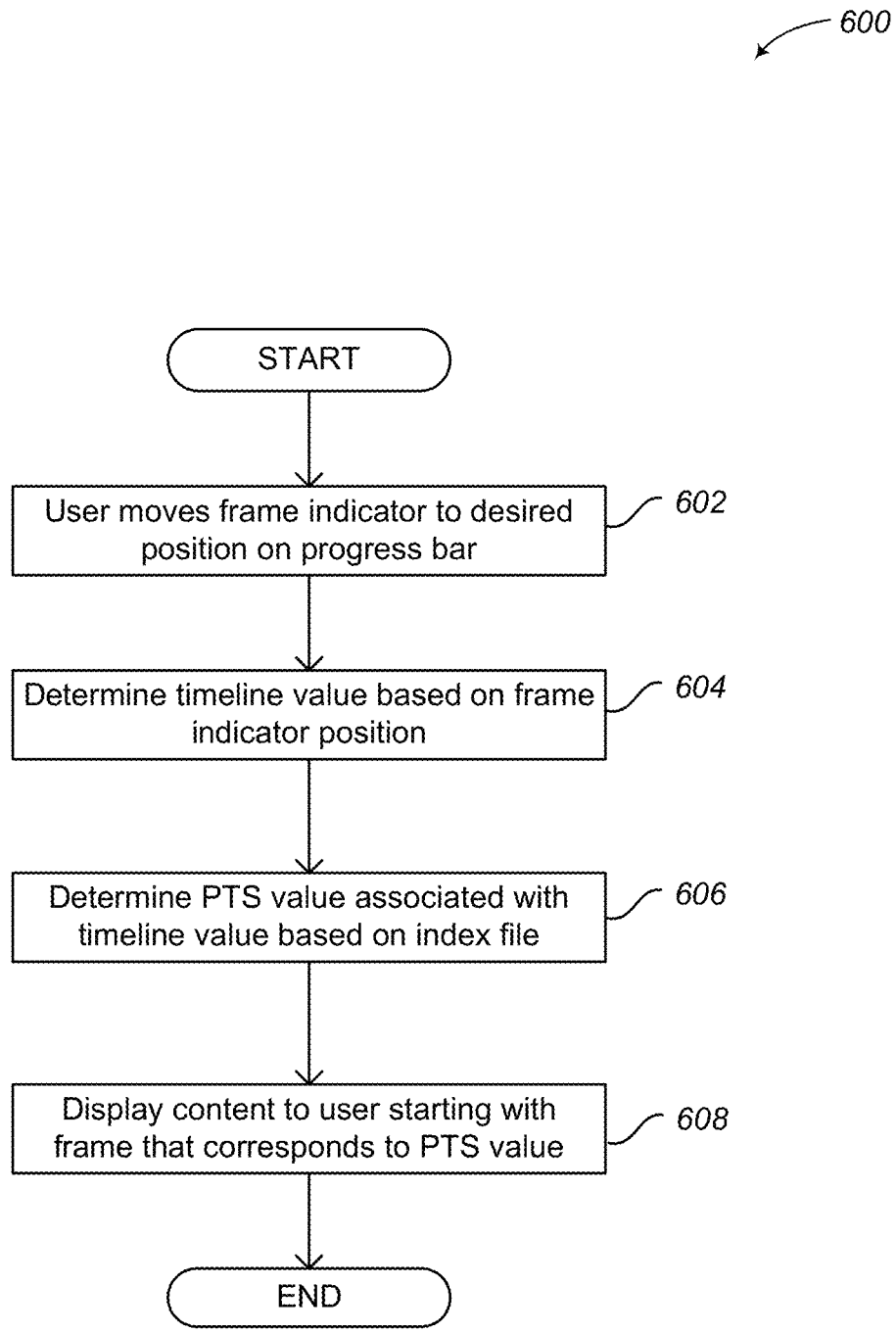
FIG. 6 illustrates a logical flow diagram generally showing one embodiment of a process for modifying playback of the real-time content based on a user's input to modify the position of the current-playing-position marker on the progress bar in accordance with embodiments described herein.

FIG. 6 illustrates a logical flow diagram generally showing one embodiment of a process for modifying playback of the real-time content based on a user's input to modify the position of the current-playing-position marker on the progress bar in accordance with embodiments described herein. In various embodiments, at least a portion of process 600 may be performed by the remote device of the user, such as remote device 108.

Process 600 begins, after a start block, at block 602, where a user moves the current-playing-position marker to a desired position on the progress bar. In some embodiments, the user may click, tap, or otherwise drag the current-playing-position marker to the desired position on the progress bar. In other embodiments, the user may select a seek button that adjusts the current-playing-position marker by a predefined time period. One example of such a seek feature is a 30 second reverse skip, which moves the current-playing-position marker 30 seconds earlier than the currently displayed frame.

Process 600 proceeds next to block 604, where a timeline value associated with the position of the current-playing-position marker is determined. In embodiments where the user drags the current-playing-position marker to a desired position on the progress bar, the timeline value may be determined based on a distance from the start of the progress bar to the position of the current-playing-position marker relative to the content duration. In at least one embodiment, this determination may be achieved by employing Eq. (1) or Eq. (2) but solving for the timeline value. In other embodiments, a mapping of positions of the current-playing-position marker and timeline values may be maintained. This mapping may be generated as the content is initially being displayed to the user, such as described above in conjunction with FIG. 5. In yet other embodiments, the timeline value may be calculated from the seek function utilized by the user, such as, for example, by subtracting 30 seconds from a current timeline value of the current-playing-position marker.

Process 600 continues at block 606, where a presentation timestamp value is determined for the timeline value of the current position of the current-playing-position marker. In one embodiment, the timeline value determined at block 604 may be employed to look up the corresponding presentation timestamp in the index file for the content.

Process 600 proceeds next to block 610, where the content is displayed to the user starting at the frame that corresponds to the timeline value for the current position of the current-playing-position marker on the progress bar.

In some embodiments, the remote device may maintain or buffer a local copy of at least a portion of the content. In this case, remote device may locally determine the frame that corresponds to the presentation timestamp value and begin displaying content from that frame. If the remote device does not have a local copy of the frame, then the remote device requests from the host device the content starting with that frame. In at least one embodiment, the remote device provides the host device with the presentation timestamp. The host device then provides to the remote device with the content starting with the frame that corresponds to the received presentation timestamp value, and the remote device displays the received content.

After block 608, process 600 may terminate and/or return to a calling process to perform other actions.

Figure 7:
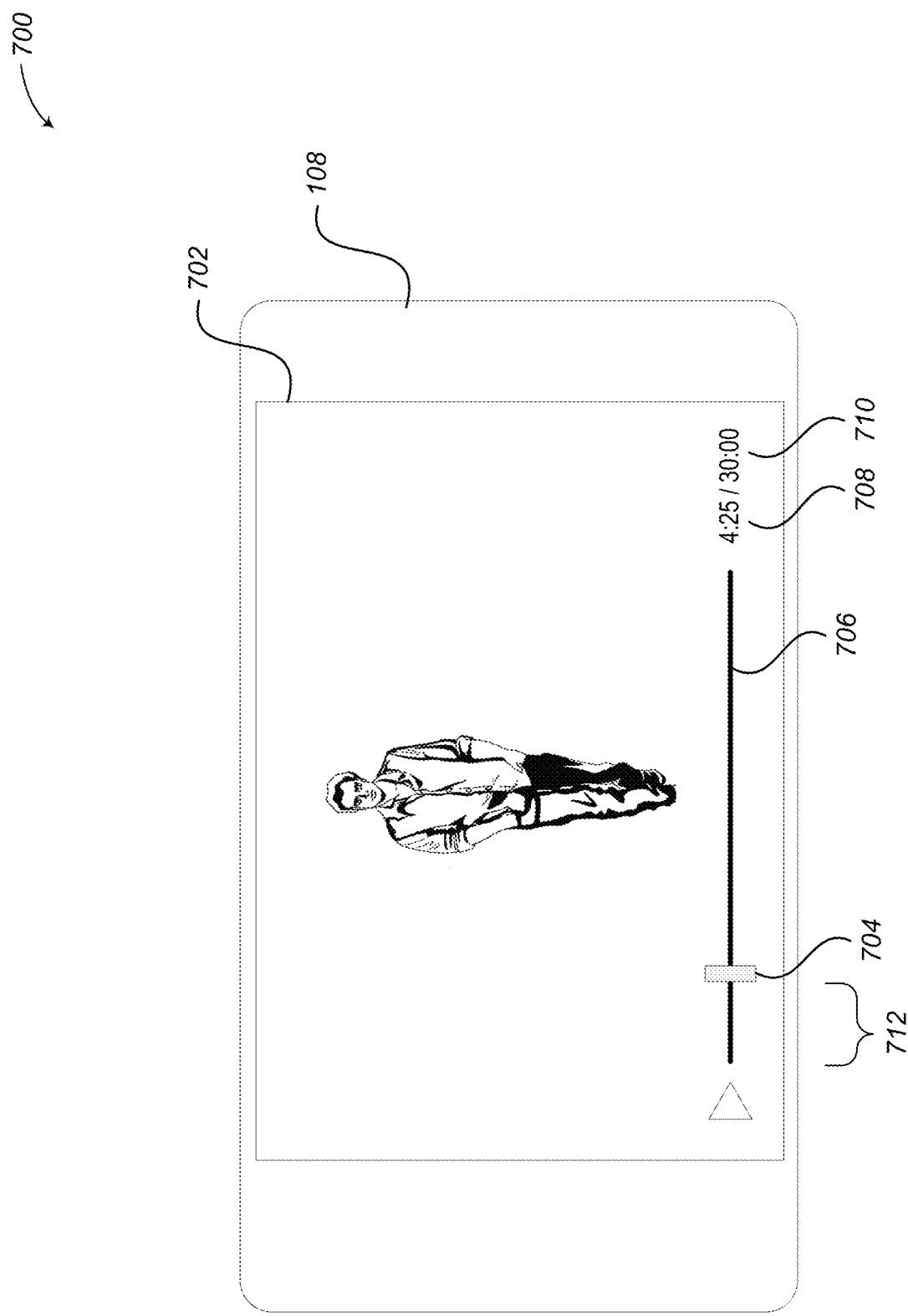
FIG. 7 shows a use case example of a mobile device displaying the real-time content and the progress bar in accordance with embodiments described herein.

FIG. 7 shows a use case example of a mobile device displaying the real-time content and the progress bar in accordance with embodiments described herein. Example 700 illustrates an embodiment of remote device 108. Content may be provided to remote device 108, which may be displayed on screen 702. Screen 702 may also display progress bar 706. Progress bar 706 includes current-playing-position marker 704. In some embodiments, progress bar 706 may also include other information regarding the displayed content, such as content duration 710 and a current time 708. Current time 708 may be the timeline value of the currently displayed frame, which may also be the position of current-playing-position marker 704. As the content is displayed, the position of current-playing-position marker 704 may be determined by employing embodiments described herein. For example distance 712 is determined relative to the length of progress bar 706, the total duration 710, and the timeline value of the current frame being displayed.

Figure 8:
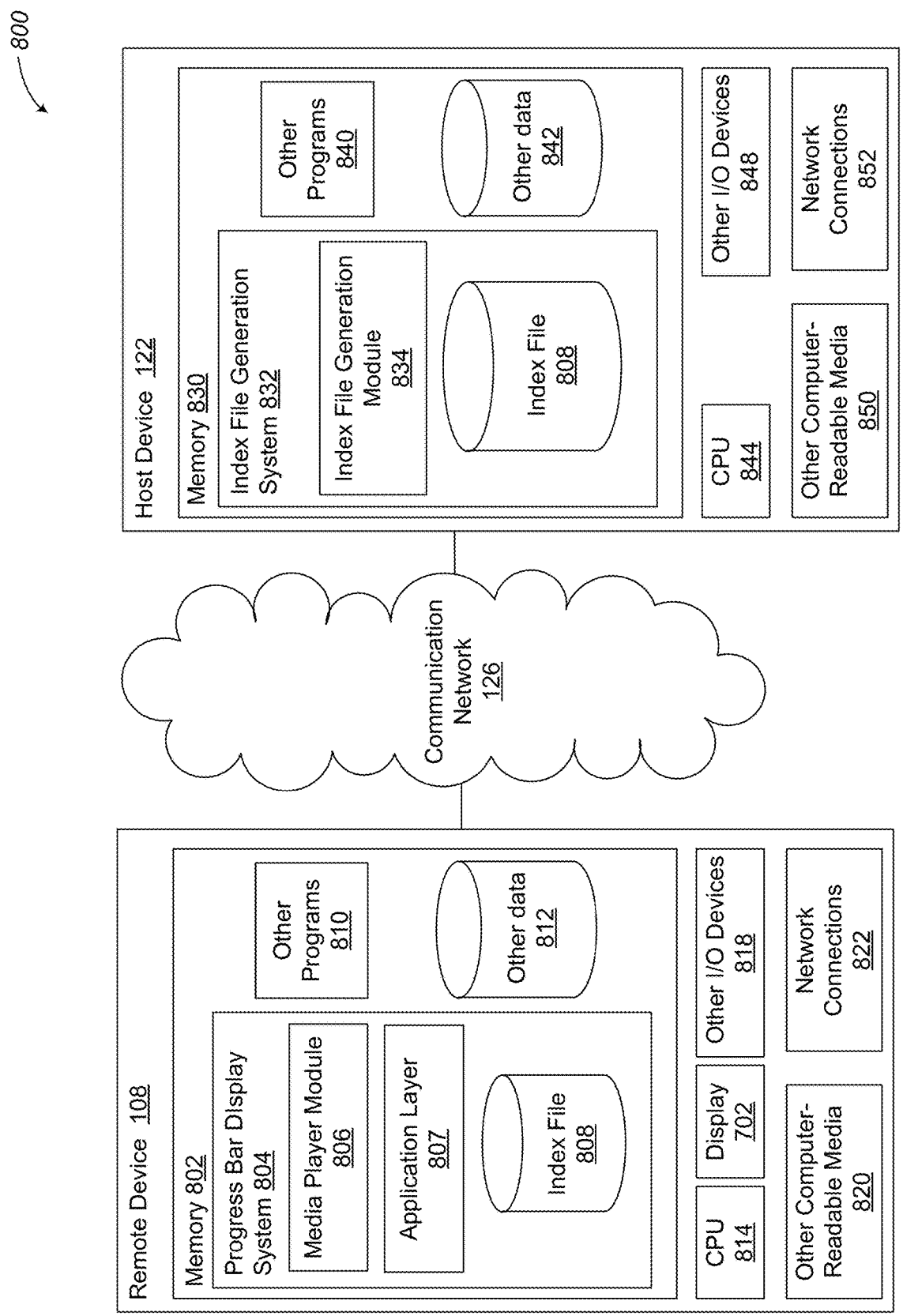
FIG. 8 shows a system diagram that describes on implementation of computing systems for implementing embodiments described herein.

FIG. 8 shows a system diagram that describes one implementation of computing systems for implementing embodiments described herein. System 800 includes remote device 108 and host device 122. Host device 122 generates an index file for real-time content, as described herein. Host device 122 provides the content and the index file to remote device 108 via communication network 126. Remote device 108 determines a position of the current-playing-position marker on a progress bar and displays the progress bar and current-playing-position marker to a user along with the content.

One or more general-purpose or special-purpose computing systems may be used to implement host device 122 to generate an index file as described above. Accordingly, various embodiments described herein may be implemented in software, hardware, firmware, or in some combination thereof.

Host device 122 may include memory 830, one or more central processing units (CPUs) 844, other I/O devices 848, other computer-readable media 850, and network connections 852 (configured to communicate with other computing devices via communication network 126). Other I/O devices 848 may include a keyboard, audio interfaces, video interfaces, or the like.

Memory 830 may include one or more various types of non-volatile and/or volatile storage technologies. Examples of memory 830 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 830 may be utilized to store information, including computer-readable instructions that are utilized by CPU 844 to perform actions, including embodiments described herein.

Memory 830 may have stored thereon index file generation system 832, which includes index file generation module 834, which may employ embodiments described herein to generate an index file for real-time content based on differences between presentation timestamp values of current frames and a presentation timestamp value of an initial frame of the real-time content relative to an initial timeline value. Memory 830 may store the generated index file 808. Memory 832 may also store other programs 840 and other data 842. For example, other data 842 may include a DVR or other recording device for storing the content.

One or more general-purpose or special-purpose computing systems may be used to implement remote device 108 to determine the position of the current-playing-position marker as described above. Accordingly, various embodiments described herein may be implemented in software, hardware, firmware, or in some combination thereof.

Remote device 108 may include memory 802, one or more CPU 814, display 702, other I/O devices 818, other computer-readable media 820, and network connections 822 (configured to communicate with other computing devices via communication network 110). Other /O devices 818 may include a keyboard or keypad, audio interfaces, video interfaces, or the like.

Memory 802 may include various types of storage technologies as described above in conjunction with memory 830. Memory 802 may be utilized to store information, including computer-readable instructions that are utilized by CPU 814 to perform actions, including embodiments described herein. Memory 802 may have stored thereon progress bar display system 804, which may store or otherwise cache index file 808 that is provided by host device 122. Index file 808 may be updated when a new index file is provided by host device 122, or index file 808 may be removed or otherwise invalidated when display of the content has ended.

Progress bar display system 804 includes media player module 806 and application layer 807, which together or individually may employ embodiments described herein to determine a current position of the current-playing-position marker based on the index file 808, and display the content and progress bar to a user. Memory 802 may also store other programs 810 and other data 812.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for presenting a current-playing-position marker on a progress bar to a user for real time content, comprising:
  receiving content that includes a plurality of video frames;
  obtaining an index file that includes a mapping between presentation timestamp values of corresponding video frames of the plurality of video frames and timeline values for the corresponding video frames, each timeline value for each corresponding video frame is representative of a corresponding position of the current-playing-position marker on the progress bar for that corresponding video frame;
  providing, to a display device for display to the user, the content and the progress bar with a position of the current-playing position marker on the progress bar being based on the index file;
  receiving a user-selected position of the current-playing-position marker on the progress bar;
  determining a current timeline value of the user-selected position;
  determining a current presentation timestamp value that maps to the determined current timeline value using the index file; and
  providing, to the display device for display to the user, the content starting with a video frame from the plurality of video frames that corresponds to the determined current presentation timestamp value.

2. The method of claim 1, wherein the current timeline value of the user-selected position is determined based on a distance between the user-selected position of the current-playing-position marker on the progress bar and a first position on the progress bar, a duration of the content, and a length of the progress bar.

3. The method of claim 1, wherein the current timeline value of the user-selected position is determined based on distance between the user-selected position of the current-playing-position marker on the progress bar and a first position on the progress bar, a duration of the content, a length of the progress bar, and an initial timeline value of a first video frame of the plurality of video frames.

4. The method of claim 1, wherein the timeline values for the corresponding video frames are based on differences between the presentation timestamp values for the corresponding video frames and an initial presentation timestamp value of a first video frame of the plurality of video frames.

5. The method of claim 1, wherein obtaining the index file comprises:
determining a timeline value for each corresponding video frame of the plurality of video frames by determining a difference between a presentation timestamp value for the corresponding video frame and an initial presentation timestamp value of a first video frame of the plurality of video frames; and
mapping the determined timeline value for each corresponding video frame with the presentation timestamp values for each corresponding video frame.

6. The method of claim 1, wherein obtaining the index file comprises:
determining an initial presentation timestamp value for a first video frame of the plurality of video frames;
for each video frame of the plurality of video frames after the first video frame:
determining, based on a difference between a presentation timestamp value for a corresponding video frame and the initial presentation timestamp value, a timeline value for the corresponding video frame; and
storing a mapping between the presentation timestamp value for the corresponding video frame and the timeline value for the corresponding video frame in the index file.

7. The method of claim 1, further comprising:
determining an initial timeline value of the content for the progress bar; and
associating an initial presentation timestamp value of a first video frame of the plurality of video frames with the initial timeline value to normalize each of the timeline values relative to the initial timeline value.

8. The method of claim 1, further comprising:
determining the position of the current-playing-position marker on the progress bar for a given video frame of the content based on a length of the progress bar, a duration of the content, and a difference between the timeline value for the given video frame and an initial timeline value of a first video frame of the plurality of video frames.

9. The method of claim 1, further comprising:
determining the position of the current-playing-position marker on the progress bar for a given video frame of the content by:
determining a distance on the progress bar based on a length of the progress bar, a duration of the content, and a difference between a presentation timestamp value for the given video frame and the initial presentation timestamp value.

10. A system for presenting content to a user, comprising:
a set-top box that includes a memory that stores instructions and a processor that executes the instructions to:
receive content that includes a plurality of frames;
generate an index file that includes a relationships between presentation timestamp values of corresponding frames of the content and timeline values for the corresponding frames, each timeline value for each corresponding frame is representative of a corresponding position of a current-playing-position marker on a progress bar for that corresponding frame;
initiate display of the content and the progress bar to the user with a position of the current-playing position marker on the progress bar being based on the index file;
receive a user-selected position of the current-playing-position marker on the progress bar;
employ the index file to determine a user-selected frame of the plurality of frames based on a current timeline value associated with the user-selected position and a current presentation timestamp value that relates to the current timeline value; and
initiate display of the content starting with a frame from the plurality of frames that corresponding to the determined current presentation timestamp value.

11. The system of claim 10, further comprising:
a remote device that includes another memory that stores other instructions and another processor that executes the other instructions to:
receive the content and the index file from the set-top box; and
display, to the user, the content and the progress bar based on the index file.

12. The system of claim 11, wherein the other processor of the remote device further executes the other instructions to:
receive user input to indicate the user-selected position of the current-playing position marker on the progress bar; and
provide the user-selected position of the current-playing position marker on the progress bar.

13. The system of claim 10, wherein the processor further executes the instructions to determine the current timeline value associated with the user-selected position of the current-playing-position marker on the progress bar based on distance between the user-selected position of the current-playing-position marker on the progress bar and a first position on the progress bar, a duration of the content, and a length of the progress bar.

14. The system of claim 10, wherein the processor further executes the instructions to determine the current timeline value associated with the user-selected position of the current-playing-position marker on the progress bar based on distance between the user-selected position of the current-playing-position marker on the progress bar and a first position on the progress bar, a duration of the content, a length of the progress bar, and an initial timeline value of a first video frame of the plurality of frames.

15. The system of claim 10, wherein the processor generates the index file by further executing the instructions to:
determine an initial presentation timestamp value for a first frame of the content;
determine an initial timeline value for the first frame of the content; and
for each next frame of the content after the first frame of the content:
determine, based on a combination of the initial timeline value and a difference between a presentation timestamp value of a corresponding frame and the initial presentation timestamp value, a timeline value for the corresponding frame; and
store a relationship between the presentation timestamp value for the corresponding frame and the timeline value for the corresponding next frame in the index file.

16. The system of claim 10, wherein the processor generates the index file by further executing the instructions to:
- determine a timeline value for each corresponding frame of the content by determining a difference between a presentation timestamp value for the corresponding frame and an initial presentation timestamp value of a first frame of the content; and
- store a relationship between the determined timeline value for each corresponding frame with the presentation timestamp values for each corresponding frame.

17. A computing device for presenting a current-playing-position marker on a progress bar to a user for real time content, comprising:
- a memory that stores instructions; and
- a processor that executes the instructions to:
  - receive the content that includes a plurality of video frames;
  - receive an index file that includes a mapping between presentation timestamp values of corresponding video frames of the plurality of video frames and timeline values for the corresponding video frames, each timeline value for each corresponding video frame is representative of a corresponding position of the current-playing-position marker on the progress bar for that corresponding video frame;
  - display the content and the progress bar with a position of the current-playing position marker on the progress bar being based on the index file;
  - receive user input that defines a user-selected position of the current-playing-position marker on the progress bar; and
  - display the content starting with a video frame from the plurality of the video frames that corresponds to a current presentation timestamp value that maps to a current timeline value associated with the user-selected position of the current-playing-position marker.

18. The computing device of claim 17, the processor further executes the instructions to:
- determine the current timeline value of the user-selected position based on a distance between the user-selected position of the current-playing-position marker on the progress bar and a first position on the progress bar, a duration of the content, and a length of the progress bar.

19. The computing device of claim 17, wherein the timeline values of the corresponding video frames is based on differences between the presentation timestamp values for the corresponding video frames and an initial presentation timestamp value of a first video frame of the plurality of video frames.

20. The computing device of claim 17, the processor further executes the instructions to:
- generate the index file by:
  - determining an initial presentation timestamp value for a first video frame of the content;
  - determining a timeline value for each corresponding video frame of the content after the first video frame based on a difference between a presentation timestamp value for each corresponding frame and the initial presentation timestamp value; and
  - mapping the timeline value to the presentation timestamp value for each corresponding frame of the content after the first frame of the content.

* * * * *